(12) United States Patent
Morrison

(10) Patent No.: US 10,783,806 B2
(45) Date of Patent: Sep. 22, 2020

(54) DISPLAY ARTICLE

(71) Applicant: R.R. DONNELLEY & SONS COMPANY, Chicago, IL (US)

(72) Inventor: Aura Lee Morrison, Chandler, AZ (US)

(73) Assignee: R. R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 16/182,016

(22) Filed: Nov. 6, 2018

(65) Prior Publication Data

US 2020/0143713 A1 May 7, 2020

(51) Int. Cl.
*G09F 3/00* (2006.01)
*G09F 3/10* (2006.01)
*B32B 7/06* (2019.01)
*B32B 7/12* (2006.01)
*G09F 3/02* (2006.01)

(52) U.S. Cl.
CPC .............. *G09F 3/0289* (2013.01); *B32B 7/06* (2013.01); *B32B 7/12* (2013.01); *G09F 3/10* (2013.01); *B32B 2519/00* (2013.01); *G09F 2003/0222* (2013.01); *G09F 2003/0226* (2013.01); *G09F 2003/0267* (2013.01)

(58) Field of Classification Search
CPC ....................................... G09F 3/204
USPC ....................................... 40/661.03
See application file for complete search history.

(56) References Cited

U.S. PATENT DOCUMENTS

| | | | | |
|---|---|---|---|---|
| 3,977,109 A * | 8/1976 | Berry, Jr. | ............. | F24H 1/40 40/124.05 |
| 4,716,669 A * | 1/1988 | Fast | .................. | G09F 3/20 40/650 |
| 6,186,555 B1 * | 2/2001 | Rawlings | ............ | G09F 3/204 281/3.1 |
| 6,701,653 B2 * | 3/2004 | Chess | ................ | G09F 3/204 40/594 |
| 8,707,600 B2 * | 4/2014 | Engelby | ............. | G09F 3/204 40/124.05 |

* cited by examiner

*Primary Examiner* — Kristina N Junge
(74) *Attorney, Agent, or Firm* — McCracken & Gillen LLC

(57) ABSTRACT

According to one aspect, a display article having a first article end and a second article end includes a first portion having a first portion end proximal the first article end and first and second spaced tabs disposed at a second portion end opposite the first portion end. A second portion is adjacent the first portion wherein the second portion includes a third portion end adjacent the second portion end and disposed between the first and second spaced tabs and a fourth portion end proximal the second article end. The first portion is adapted to be secured to a support apparatus and the second portion is adapted to be deflected to a display position transverse to the first portion.

25 Claims, 6 Drawing Sheets

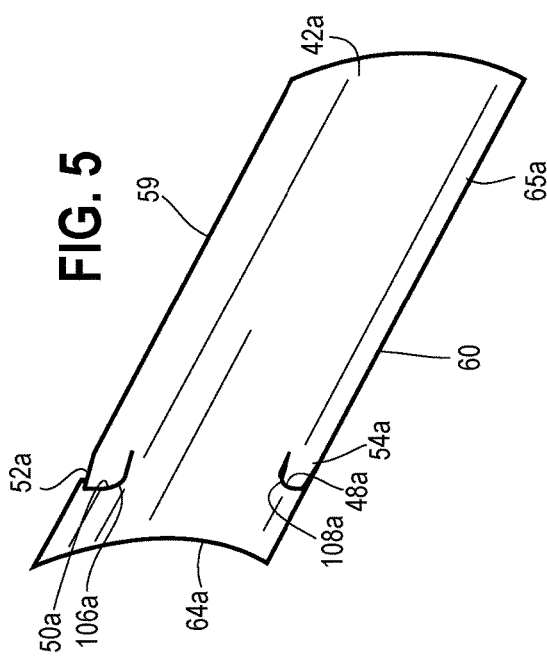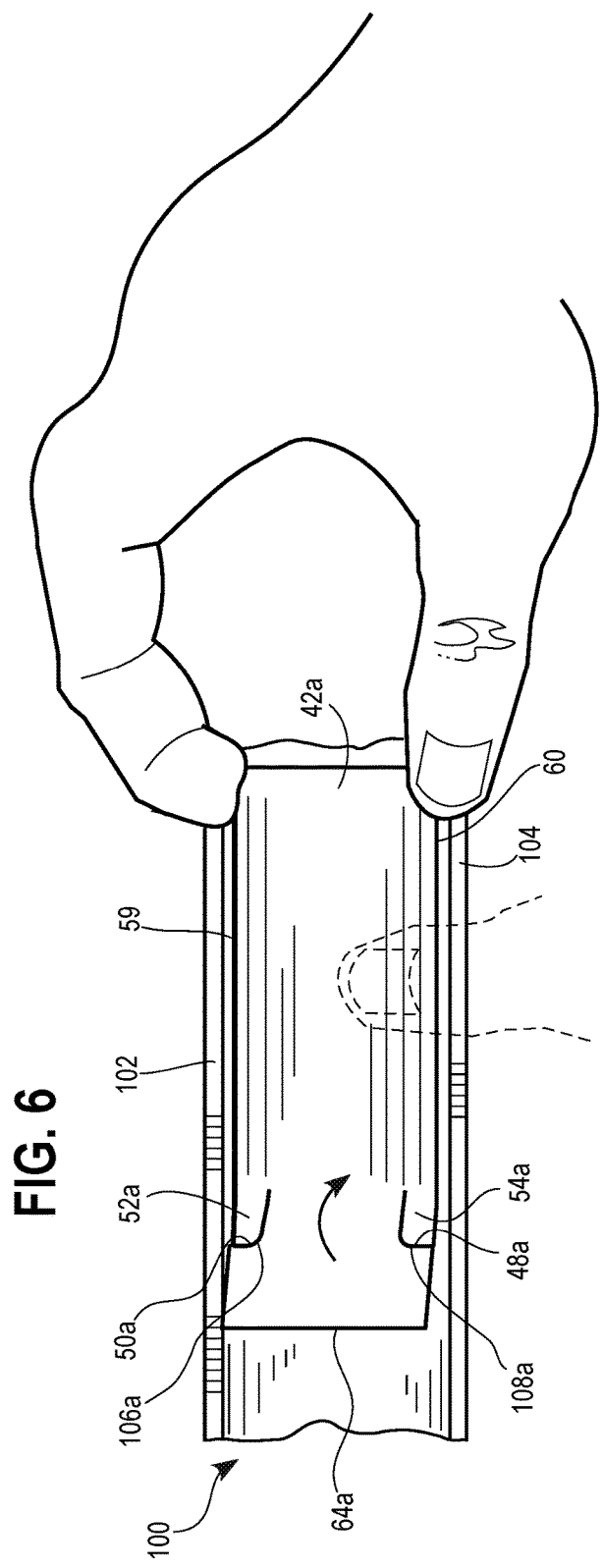

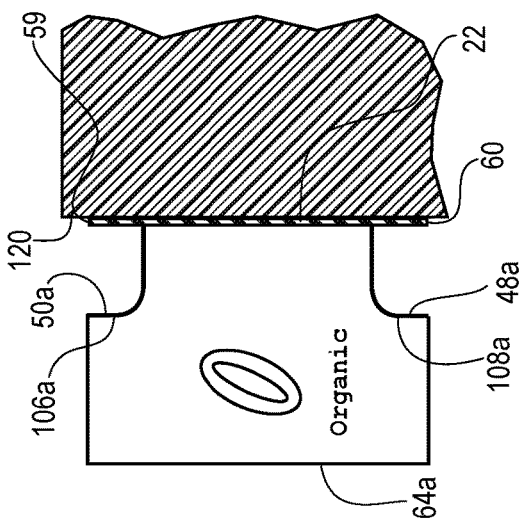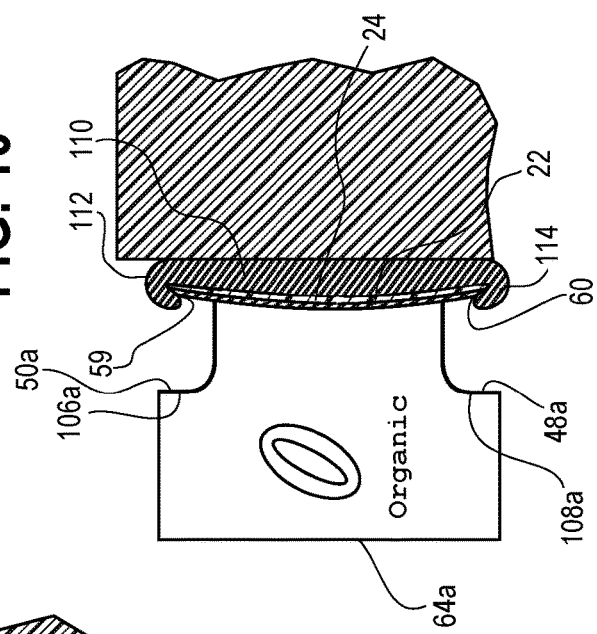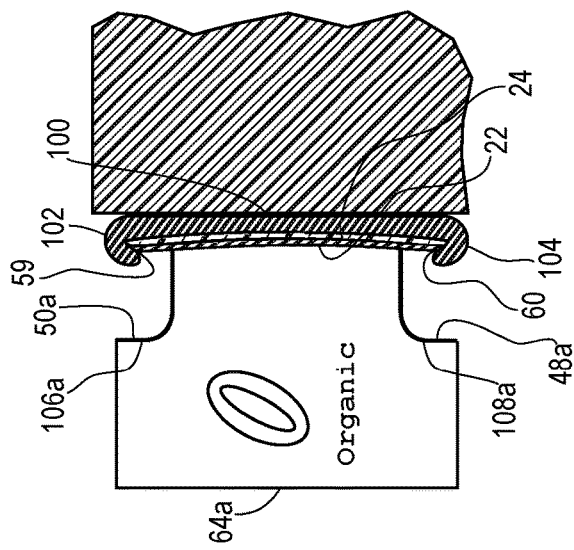

DISPLAY ARTICLE

FIELD OF DISCLOSURE

The present subject matter relates generally to printed display articles, and more particularly to a label for use on an apparatus that supports items or on the item itself.

BACKGROUND

A retail establishment, such as a grocery store, drug store, delicatessen, gift shop, or other market typically displays items for sale on shelves and/or other support structure(s). In a well-known display arrangement, each of a plurality of groups of like items (e.g., items having the same product name, manufacturer or supplier, and size) is stored together on one or more shelves with one or more labels identifying the individual items of the group wherein the one or more labels occupy shelf locations adjacent the items. Sheets of labels may be initially obtained from a label supplier in a blank state, except possibly for images, indicia, or other preprinted content indicating, for example, the name of the retail establishment, a tagline associated with the establishment, a logo, a generalized marketing message, etc., and subsequently marked by hand or post-printed by a printer with the item and price information associated with each group of items. Supplemental (e.g., more detailed) product information may also be post-printed on each label, such as the price per unit (e.g., in the case of liquid or powdered items, cost per unit volume or weight), "price good-though" date, "use-by" date, the country of origin, etc. Once marked with such information the sheet is readily separable into individual labels In many cases, the shelf has a concave label holder disposed on a forward facing surface of the shelf wherein the label holder has upper and lower lips. The label is held in place between the lips with or without the assistance of adhesive on the back of the label. In other circumstances the label holder may not be present, in which case the shelf includes a simple forwardly-directed face or end plane that can accept an adhesive-backed label.

In some cases, a retailer may wish to call attention to further specialized product information to a potential customer. For example, one or more products may be organically grown, produced with specialized ingredients (such as non-genetically modified foodstuffs), manufactured and sold by fair-trade sources, be on sale at a reduced price, and the like. In such cases, the retailer may use intruding labels that are directed transverse to the shelf and extend into the adjacent aisle a short distance. The intruding label is often preprinted with a bright and/or contrasting background color and may further have preprinted indicia thereon that alert passersby to the specialized product information. The intruding label may (but need not) further include post-printed indicia added by a laser or other printer. In a known construction, such an intruding label has adhesive-backed outwardly extending feet or other apparatus for securing the intruding label to a portion of a shelf and/or to a standard label, for example one or more of the labels discussed in the preceding paragraphs. In any event, the intruding labels are separate from the standard labels.

As should be evident from the foregoing, using intruding labels together with standard labels involves extra installation effort and complexity to create a desired display and the cost of separate intruding and standard labels can be high. Also, the intruding labels and the standard labels may require separate pre- and post-printing by marking device(s), further increasing complexity and cost.

SUMMARY

According to one aspect, a display article having a first article end and a second article end includes a first portion having a first portion end proximal the first article end and first and second spaced tabs disposed at a second portion end opposite the first portion end. A second portion is adjacent the first portion wherein the second portion includes a third portion end adjacent the second portion end and disposed between the first and second spaced tabs and a fourth portion end proximal the second article end. The first portion is adapted to be secured to a support apparatus and the second portion is adapted to be deflected to a display position transverse to the first portion.

According to another aspect, a display article having a first article end and a second article end comprises a first portion having a first portion end proximal the first article end and first and second spaced tabs disposed at a second portion end opposite the first portion end. A second portion is adjacent the first portion and integral therewith wherein the second portion includes a third portion end adjacent the second portion end and disposed between the first and second spaced tabs and a fourth portion end proximal the second article end. The first portion includes a first transverse edge and a second transverse edge adapted to be received in a first lip and a second lip, respectively, of a label holder such that the first portion is maintained in a curved shape. The first portion further includes a back face and an adhesive disposed on the back face that is adapted to be adhered to a shelf. Further, the second portion includes a weakened portion adapted to be deflected to a display position transverse to the first portion.

Other aspects and advantages will become apparent upon consideration of the following detailed description and the attached drawings wherein like numerals designate like structures throughout the specification.

BRIEF DESCRIPTION OF THE DRAWINGS

FIG. 5 is an isometric view of the label of FIG. 4 after curling of a main portion thereof and before rotation of a flag portion;

FIG. 6 is a front elevational view of the label of FIG. 5 after rotation of the flag portion thereof and during a process of securing the label to a concave label holder;

FIG. 9 is a cross-sectional view taken generally along the lines 9-9 of FIG. 8; and FIGS. 10 and 11 are sectional views similar to FIG. 9 illustrating installation of the label of FIG. 5 on a convex label holder and a planar shelf edge, respectively.

DETAILED DESCRIPTION

Figure 1:
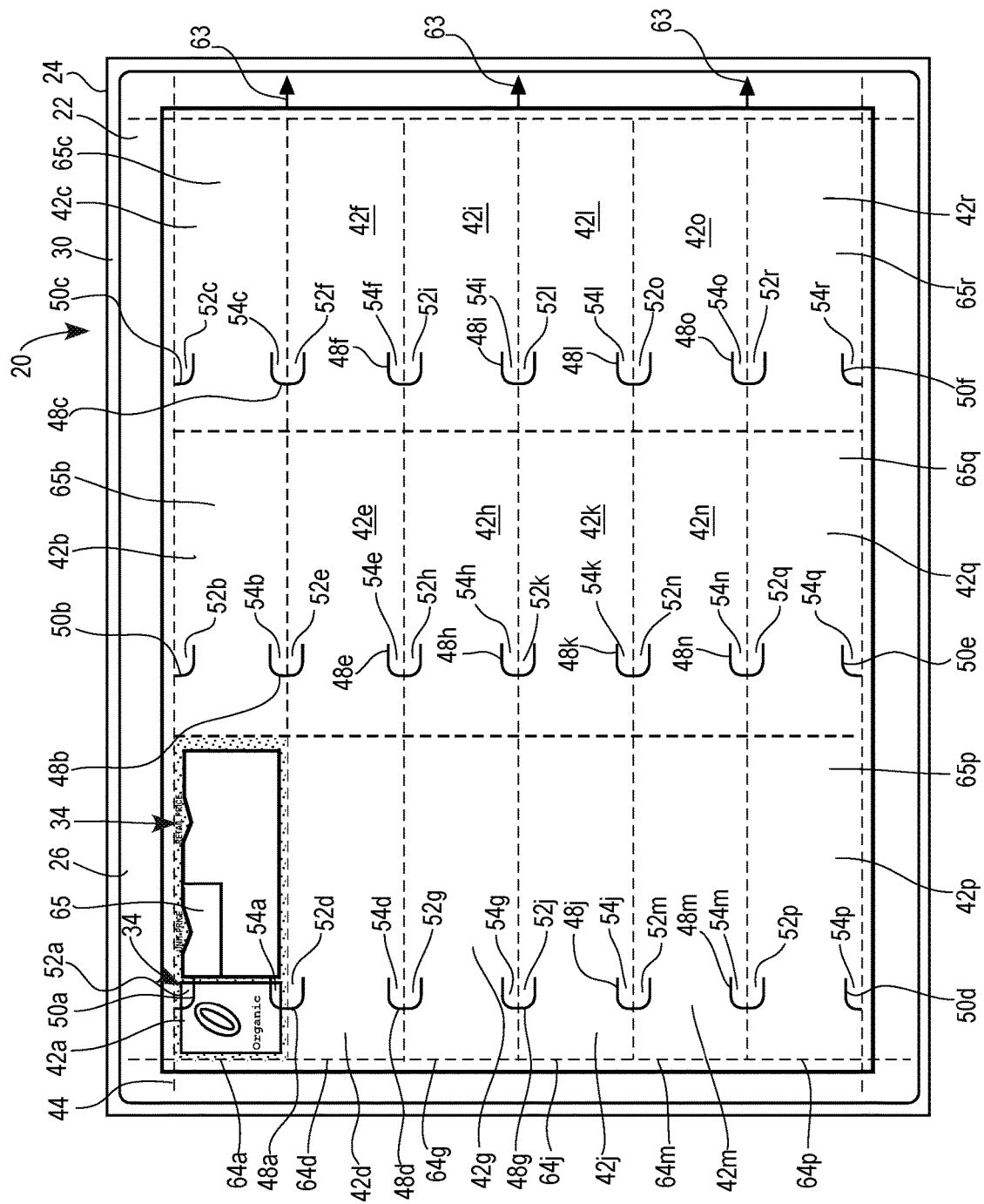
FIG. 1 is a front elevational view of a sheet of labels illustrating one of the labels after preprinting and before post-printing according to one embodiment and omitting preprinting and post-printing of the remaining labels.
Figure 2:
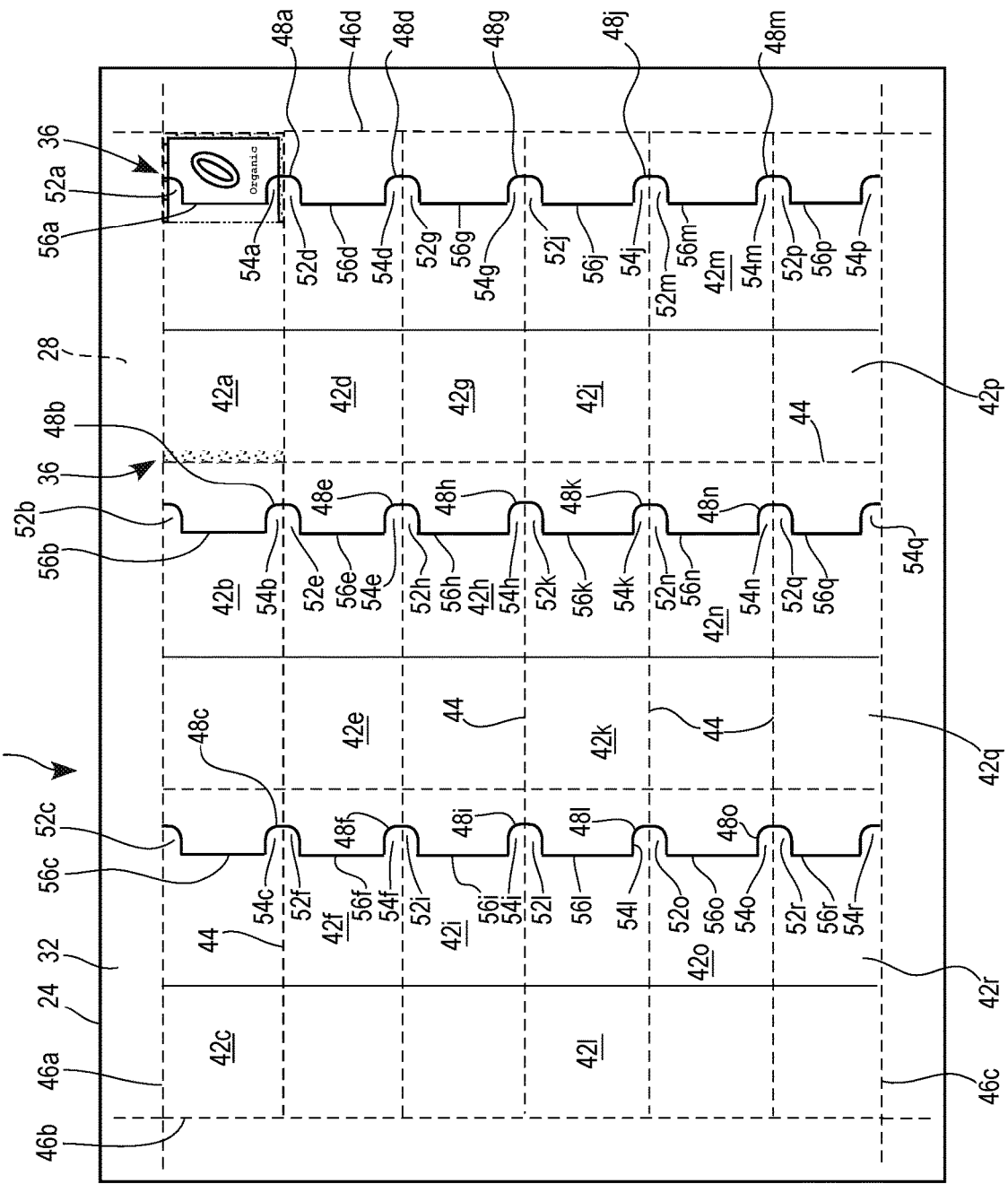
FIG. 2 is a rear elevational view of the sheet of labels of FIG. 1.

FIGS. 1 and 2 show a sheet 20 of labels according to an embodiment. The sheet 20 includes first and second joined layers 22, 24, respectively, although a single layer construction or a construction utilizing more than two layers are contemplated. Also in the illustrated embodiment, each of the first and second layers 22, 24 includes front and rear faces 26, 28 and 30,32, respectively. As shown, the front face 26 of the first layer 22 may be suitable to receive optional preprinted image(s) and/or indicia 34 thereon and the rear face 28 of the first layer 22 is coated with a pressure sensitive adhesive. The front face 30 of the second layer 24 comprises an adhesive release surface while the rear face 32 of the second layer 24 is suitable to receive further optional preprinted images and/or indicia 36 thereon. During production, the layers 22, 24 are registered with one another, joined, and pre-processed before delivery to a user e.g., by applying the optional preprinting thereto and forming individual labels using perforations, cuts, and/or weakened portions, for example, as described hereinafter.

Individual labels 42a, 42b, 42c, . . . 42r are formed in any suitable fashion, for example, by forming perforations 44 in a grid pattern. Preferably, the perforations 44 extend fully through the first and second layers 22, 24, although this need not be the case inasmuch as the perforations 44 may extend only through one of the first layer 22 or the second layer 24 and die cuts and/or other perforations and/or weakened portions that are aligned with the perforations 44 could separately be formed in the other of the first and second layers 22, 24. As a further alternative, the perforations 44 could be replaced by one or more die cuts and/or weakened portions provided enough material remains to support the labels 42 adequately for subsequent processing, for example, by a laser or other printer that applies post-printing to the labels.

A further series of perforations 46a, 46b, 46c, 46d surround the perforations 44. As with the perforations 44, the perforations 46 preferably extend fully through the first and second layers 22, 24, although this need not be the case, provided one or more die cuts and/or weakened portions are provided in one or both of the layers 22, 24 as described in the immediately preceding paragraph.

Die cuts 48a, 48b, 48c . . . , 48o, each preferably having an approximate U-shape, extend fully through the layers 22, 24 at locations that span adjacent upper and lower portions of the labels 42d-42o. Further die cuts 50a-50f, each preferably of an approximate L-shape, extend fully through the layers 22, 24 at upper portions of the labels 42a-42c and at lower portions of the labels 42p-42r. The die cuts 48a-48o and the die cuts 50a-50f are aligned with one another such that each label 42a-42r includes an upper tab 52a-52r, respectively, and a lower tab 54a-54r, respectively.

Referring to FIG. 2, each label 42a-42r includes a line of weakness 56a-56r, respectively, extending between the upper and lower tabs 52, 54 of such label. In the preferred embodiment, each line of weakness 56 is provided by a die cut that extends through the layer 24, although any suitable feature(s) or combinations of features could be used, such as a perforation, a fold line, or any other continuous or discontinuous cut or removal or deformation of material in one or both of the layers 22, 24.

In the preferred embodiment, the labels 42a-42r are identical to one another, and hence, only the labels 42a will be described in detail herein. Of course, one or more of the labels 42a-42r may be different than the remaining labels, if desired.

Referring to FIGS. 2, 3, 3A, and 4, the label 42a includes a die cut 58 that extends fully through the layer 24 (but not the layer 22) and further extends fully from top to bottom edges 59, 60 of such label 42a. The die cut 58 (FIGS. 3A and 4) separates the layer 24 into two portions 61a and 62a associated with the label 42a.

Figure 3A:
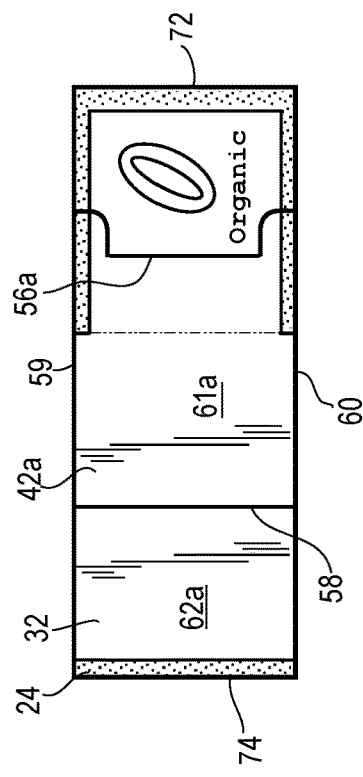
FIG. 3A is a rear elevational view of the label of FIG. 3.
Figure 3:
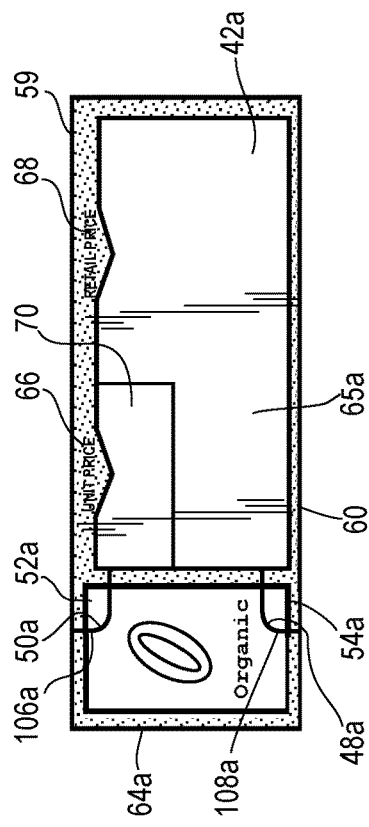
FIG. 3 is a front elevational view of one of the labels of FIG. 1 with preprinting.
Figure 4:
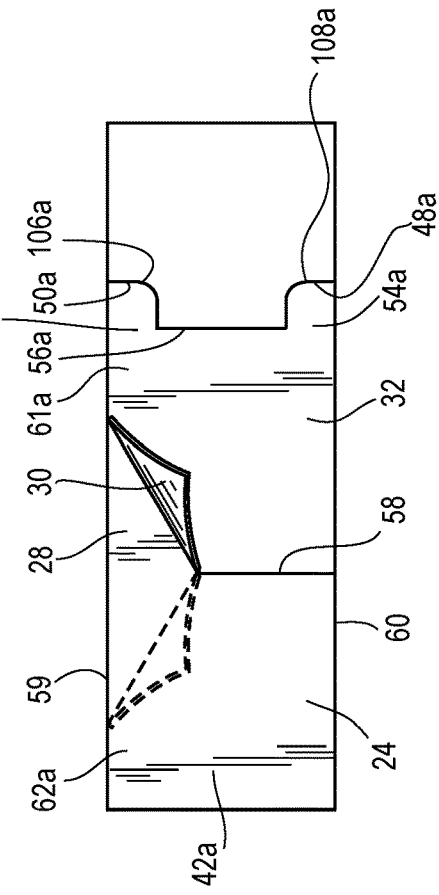
FIG. 4 is a rear elevational view of the label of FIG. 3 with portions of a rear face liner peeled partially away and preprinting and post-printing omitted therefrom.

As seen in FIG. 1, preferably, the sheet 20 is preprinted with one or more images, such as one or more arrows 63, on the layer 22. As seen in FIGS. 1 and 3, other preprinted images, such as the illustrated stylized letter "O" and the word "Organic" together with one or more other printed areas, may be supplied on either side of a flag portion 64a-64r of each label 42a-42r, respectively. Further in the illustrated embodiment as seen specifically in FIG. 3, a main portion 65a-65r of each label 42a-42r may be preprinted with one or more images on the layer 22 that, among other things, define the words "unit price" 66 and "retail price" 68 and may further be preprinted with a shaded box 70 below the "unit price" indicia 66. One or more other portions on the layer 24 (FIG. 3A) may be preprinted to form panels, such as the panels 72 and 74, together with indicia comprising the stylized letter "O" and the word "Organic." Of course, such printing is exemplary only, it being understood that other preprinting may be undertaken or preprinting may be omitted entirely, as desired. Also, any color or combination of colors may be preprinted at any location(s) on the one or more of the flag portions 64a-64r and/or one or more of the main portions 65a-65r. The labels 42a-42r or portions thereof may all be identical once preprinted or some or all of the labels 42a-42r or portions thereof may be different from one another once preprinted. Thus, for example, the preprinting on opposite sides of the flag portion 64a may the same or different from one another, as desired.

Figure 8:
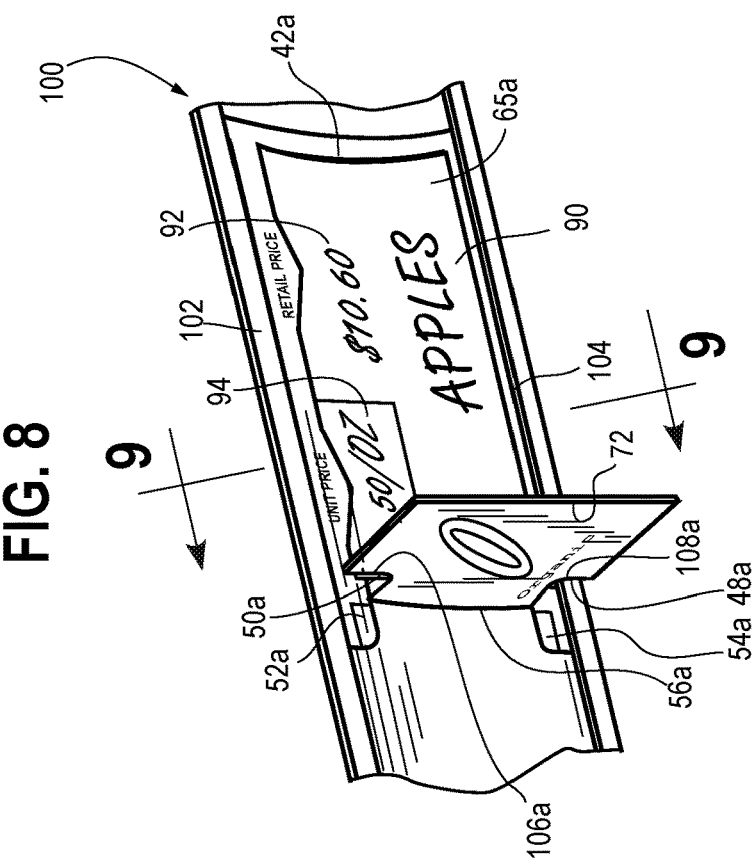
FIGS. 7 and 8 are isometric right-hand and left-hand views of the label of FIG. 5 after installation in the label holder and showing the preprinting and post-printing.
Figure 7:
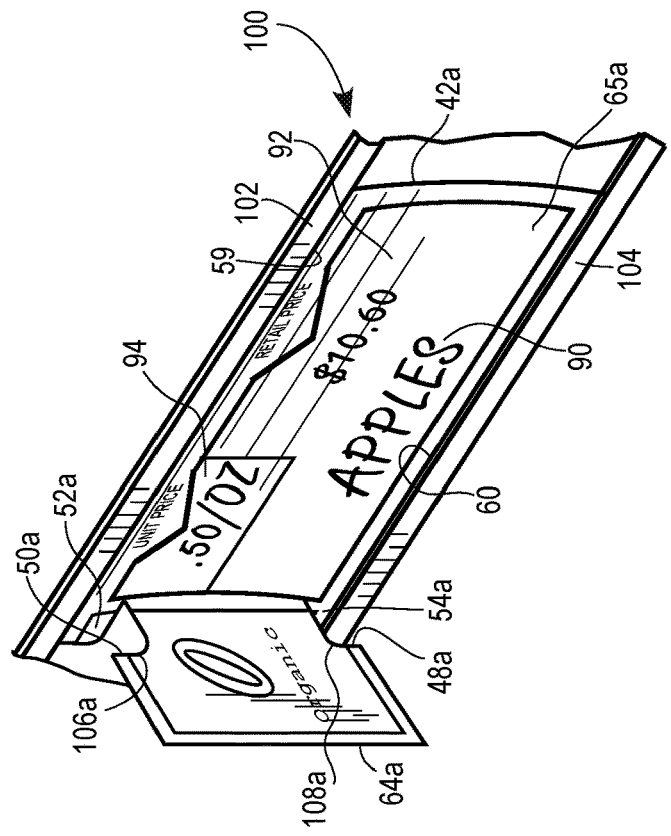

The labels 42a-42r may be packaged individually as the single sheet 20 or may be packaged with other sheets of labels. In the latter case, the sheet(s) may be identical to one another or one of more of the sheets may be different than other sheets. In any event, the sheets are delivered to a user, such as a retailer, who may use a laser printer or other printer or marking device to mark indicia and/or image(s) on some or all of the labels 42a-42r of the sheet 20 and/or some or all of the labels of any other sheets. In the event that a printer is to be used to apply post-printed indicia and/or image(s), the arrow(s) 63 indicate the direction of feed of the sheet 20 into the printer for correct printing without jamming the printer. While post-printing may be undertaken exclusively on the layer 22, post-printing may alternatively or in addition be undertaken on the layer 24, as noted above. A sample post-printed label 42a is illustrated in FIGS. 7 and 8, in which the label is post-printed with indicia including a description field 90, a retail price field 92, and a unit price field 94. Other labels may include identical fields, or one or more of the post-printed field(s) may be different than those shown in FIGS. 7 and 8. Once post-printing is complete, the labels 42 of the sheet 20 (and the labels of any other sheets that are to be used) are ready to be applied to support apparatus and/or directly to goods or items.

INDUSTRIAL APPLICABILITY

Once post-printing (if undertaken) is complete, a user removes the portion of the sheet 20 surrounding the labels 42a-42r from the sheet at the perforations 46a-46d. Individual labels 42, such as the label 42a, may then be readily separated from remaining labels of the sheet 20. If the label 42a is to be applied without adhesive to a label holder, such as the holder 100 shown in FIGS. 6-9, the main portion 65a of the label 42a is curled into a concave lengthwise shape (as viewed from the front as illustrated in such FIGS.) without removing the portions 61a, 62a of the layer 24. This curling process results in the tabs 52a, 54a initially moving forward of adjacent portions 106a, 108a of the flag portion 64a due to the presence of the cuts 48a, 50a. While maintaining the curling of the main portion 65a, a user then rotates the flag portion 64a outwardly about the line of weakness 56a to a position transverse to the main portion 65a. During such movement, the adjacent portions 106a, 108a are moved forwardly of the tabs 52a, 54a. The user then preferably folds the label 42a about the line of weakness. The user may then insert the curled main portion 65a into the holder 100 adjacent the corresponding goods or items stored on the shelf past upper and lower lips 102, 104, respectively, and then releases the main portion 65a, whereupon the top and bottom edges 59, 60 deflect outwardly behind the lips 102, 104, respectively, (FIGS. 7-9) to retain the label 42a in position on the holder 100. The flag portion 64a remains in the transverse position, preferably (although not necessarily) at or approximately ninety degrees relative to the shelf that supports the associated articles due to the fold therein and the interference between the adjacent portions 106a, 108a of the flag portion 64a and the tabs 52a, 54a. The flag portion 64a thus intrudes somewhat into the aisle adjacent the label 42a to encourage a shopper to view the matter printed on the flag portion 64a, and thus, the main portion 65a, and/or to call attention to the articles on the adjacent shelf.

During the installation process, the user may remove one or both of the portions 61a, 62a of the layer 24 to expose the adhesive carried thereby. Installation may otherwise be undertaken as noted above to secure the label 42a to the holder 100, this time with the assistance of the adhesive to keep the label 42a in place.

Alternatively, if label 42a is to be applied without adhesive to a label holder, such as the holder 110 shown in FIG. 10, the main portion 65a of the label 42a is curled into a convex lengthwise shape (as viewed from the side as illustrated in FIG. 10) without removing the portions 61a, 62a of the layer 24. This curling process results in the tabs 52a, 54a initially moving backward of adjacent portions 106a, 108a of the flag portion 64a due to the presence of the cuts 48a, 50a. While maintaining the curling of the main portion 65a, a user then rotates the flag portion 64a outwardly about the line of weakness 56a to a position transverse to the main portion 65a. The user then preferably (but need not) folds the label 42a about the line of weakness. The user may then insert the curled main portion 65a into the holder 110 adjacent the corresponding goods or items stored on the shelf past upper and lower lips 112, 114, respectively, and then releases the main portion 65a, whereupon the top and bottom edges 59, 60 deflect outwardly behind the lips 112, 114, respectively, (FIG. 10) to retain the label 42a in position on the holder 110. The flag portion 64a remains in the transverse position, preferably (although not necessarily) at or approximately ninety degrees relative to the shelf that supports the associated articles due to the fold therein and the interference between the adjacent portions 106a, 108a of the flag portion 64a and the lips 112, 114. The flag portion 64a thus intrudes somewhat into the aisle adjacent the label 42a to encourage a shopper to view the matter printed on the flag portion 64a, and thus, the main portion 65a, and/or to call attention to the articles on the adjacent shelf.

The label 42a may alternatively be affixed to a shelf not having a holder 100 or a holder 110, in which case the label 42a may be secured by the exposed adhesive to an edge 120 or another portion of the shelf. Still further, the label 42a may be affixed to the good or item itself or to another article using the exposed adhesive. In any event, while not necessary, the adhesive may optionally be of the low-tack type to facilitate subsequent removal of the label 42a without leaving a portion of the label 42a and/or adhesive residue on the edge 120, the shelf, the good or other item, or other article.

In summary, the foregoing labels minimize the extra installation effort and complexity of using intruding labels together with separate standard labels to create a desired display. Although the labels find particular utility in grocery stores and the like, the labels can be used in any retail establishment that utilizes shelving, and can even be used directly on goods themselves.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A display article having a first article end and a second article end, comprising:
    a main portion having first and second spaced tabs disposed between the first article end and the second article end; and
    a flag portion adjacent the main portion wherein the flag portion includes a weakened portion disposed between the first and second spaced tabs;
    wherein the main portion and the first and second tabs are coplanar and are adapted to be maintained in contact with a support apparatus; and
    wherein the flag portion is adapted to be deflected about the weakened portion to a display position transverse to the main portion and wherein the flag portion is adapted to be maintained at the display position by interference between the flag portion and upper and lower lips of the support apparatus.

2. The display article of claim 1, wherein the main portion includes a first face and a second face and the first face is adapted to receive printing and the second face includes an adhesive.

3. The display article of claim 2, wherein the second face is covered by a releasable layer.

4. The display article of claim 3, wherein the releasable layer includes die cuts proximal the first and second article ends.

5. The display article of claim 1, in combination with the first support apparatus comprising a label holder that maintains the main portion in a curved shape.

6. The display article of claim 1, wherein the weakened portion comprises a die cut.

7. The display article of claim 6, wherein the flag portion includes a first face that has first indicia printed thereon and a second face opposite the first face that has second indicia printed thereon.

8. The display article of claim 7, wherein the first indicia and the second indicia are identical.

9. The display article of claim 7, wherein the first indicia and the second indicia are different.

10. The display article of claim 7, wherein the second face comprises a releasable layer and the weakened portion comprises a die cut in the releasable layer.

11. The display article of claim 1, wherein the flag portion has a height less than a distance between the upper and lower lips.

12. The display article of claim 1, wherein the first and second tabs include first and second tab edges, respectively, substantially coincident with a top edge and a bottom edge, respectively, of the flag portion.

13. The display article of claim 12, wherein the first and second tabs include third and fourth tab edges, respectively, and first and second tab ends, respectively.

14. The display article of claim 13, wherein the third and fourth tab edges are of substantially the same length.

15. The display article of claim 14, wherein the first and second tabs have a first length and are adapted to break away from the flag portion when the flag portion is deflected about the weakened portion.

16. A display article having a first article end and a second article end, comprising:
   a first portion having a first portion end proximal the first article end and first and second spaced tabs disposed at a second portion end opposite the first portion end; and
   a second portion adjacent the first portion and integral therewith wherein the second portion includes a third portion end adjacent the second portion end and disposed between the first and second spaced tabs and a fourth portion end proximal the second article end wherein the first portion and the second portion together define a rectangle;
   wherein the first portion includes a first transverse edge and a second transverse edge adapted to be received in a first hp and a second lip, respectively, of a label holder such that the first portion is maintained in a curved shape and wherein the first portion and the first and second spaced tabs further include a back face and an adhesive disposed on the back face that is adapted to be adhered to a shelf; and
   wherein the second portion includes a weakened portion about which the second portion is adapted to be deflected to a display position transverse to the first portion and wherein the second portion is adapted to be maintained at the display position by interference between portions of the second portion and the first and second lips.

17. The display article of claim 16, wherein the back face is covered by a releasable liner that includes die cuts proximal the first and second article ends.

18. The display article of claim 16, wherein the second portion includes a first face that has first indicia printed thereon and a second face opposite the first face that has second indicia printed thereon.

19. The display article of claim 18, wherein the first indicia and the second indicia are identical.

20. The display article of claim 18, wherein the first indicia and the second indicia are different.

21. The display article of claim 18, wherein the second face comprises a releasable layer and the weakened portion comprises a die cut in the releasable layer.

22. The display article of claim 16, wherein the first and second tabs include first and second tab edges, respectively, substantially coincident with a top edge and a bottom edge, respectively, of the second portion.

23. The display article of claim 22, wherein the first and second tabs include third and fourth tab edges, respectively, and first and second tab ends, respectively.

24. The display article of claim 23, wherein the third and fourth tab edges are of substantially the same length.

25. The display article of claim 24, wherein the first and second tabs have a first length and the weakened portion is disposed along the first length.

* * * * *